(12) United States Patent
Kang et al.

(10) Patent No.: US 6,222,810 B1
(45) Date of Patent: Apr. 24, 2001

(54) DISK GUIDE APPARATUS FOR OPTICAL DISK PLAYBACK SYSTEM TO PREVENT MISINSERTIONS

(75) Inventors: Seong Sik Kang, Suwon; In Hwan Lee, Anyang; Wook Young Soh, Suwon; Sung Woong Ahn, Seoul; Tae Hyoung Kim, Suwon, all of (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/132,510

(22) Filed: Aug. 11, 1998

(30) Foreign Application Priority Data

Aug. 11, 1997 (KR) .................................................. 97-38250
Nov. 21, 1997 (KR) .................................................. 97-62017

(51) Int. Cl.$^7$ .................................................. G11B 17/04
(52) U.S. Cl. .................................................. 369/77.1
(58) Field of Search .................................. 369/77.1, 77.2

(56) References Cited

U.S. PATENT DOCUMENTS

| | | | |
|---|---|---|---|
| 4,470,136 | * 9/1984 | Takahashi et al. | 369/77.1 |
| 5,038,337 | * 8/1991 | Muramatsu et al. | 369/77.1 |
| 5,173,893 | * 12/1992 | Morikawa et al. | 369/77.1 |
| 5,416,763 | * 5/1995 | Ohsaki | 369/77.1 |

\* cited by examiner

*Primary Examiner*—William R. Korzuch
(74) *Attorney, Agent, or Firm*—Birch, Stewart, Kolasch & Birch, LLP

(57) ABSTRACT

A disk guide apparatus for an optical disk playback system includes a pinion gear having at least one non-toothed portion, a pair of guide plates respectively having a gear portion being engaged to the pinion gear, and a spring providing an elastic restoration to the guide plates. The apparatus prevents an erroneous insertion of the optical disk and carries out a disk loading/unloading operation by use of minimal parts thereof, thereby realizing a simplified structure and an easy assembly as well as decreasing production cost and improving workability.

11 Claims, 7 Drawing Sheets

DISK GUIDE APPARATUS FOR OPTICAL DISK PLAYBACK SYSTEM TO PREVENT MISINSERTIONS

BACKGROUND OF THE INVENTION

1. Field of the Invention

The present invention relates to a disk guide apparatus for an optical disk playback system, and more particularly, to an improved disk guide apparatus for an optical disk playback system which realizes simplified structure and decreases the number of required parts for thereby preventing erroneous insertion of the disk and which provides an oval shaped guide pin for thereby carrying out a loading/unloading operation of an optical disk with less power, thereby decreasing production cost as well as improving workability.

2. Description of the Background Art

In general, an optical disk playback apparatus denotes a device that plays back a DVD (Digital Video Disk) or a CD (Compact Disk). Depending upon disk loading methods, the disk playback apparatus varies to a tray loading type and a slot loading type.

In the tray loading type, an optical disk is placed on a plate-shaped tray which then moves back and forth to load or unload a target disk, and in the slot loading type, the disk is inserted into a slot of the optical disk playback apparatus for its loading and the disk becomes also unloaded through the slot.

A conventional disk guide apparatus for such an optical disk playback system is provided in a slot loading type optical disk playback system for thereby serving to guide the optical disk being inserted by a user.

As shown in FIGS. 1 and 2, such a conventional disk guide apparatus 100 for an optical disk playback system includes a stopper plate 10 having thereat an insertion entrance (not shown, and referred to as slot, hereinafter) of the optical disk. The stopper plate 10 includes a stepped portion 11 indented in the center thereof and formed at a front portion of a housing 2.

In rear of the stopper plate 10, there are provided a pair of slide plates 20, 20' facing against each other for thereby preventing an erroneous insertion and guiding the loading/unloading of the optical disk 1. The pair of the slide plates 20, 20' respectively have an extension toward each other in symmetry, and rack gears 21, 21' are formed on inner sides of the extended portions thereof.

A pinion gear 30 is engaged between the rack gears 21, 21' to rotate on the rack gears 21, 21' when the optical gear 1 is inserted.

Triangular guide bosses 40, 40' are hingedly fixed by a hinge pin 3 to front side portions of the slide plates 20, 20'. Guide pins 41, 41' are downwardly extended from lower edge portions of the guide bosses 40, 40'. Protrusions 42, 42' are extended from side edge portions of the guide bosses 40, 40'.

Torsion springs 50, 50' are worn on the hinge pins 33 that hingedly connect the guide bosses 40, 40' to the slide plates 20, 20'. An end of each of the torsion springs 50, 50' is hooked on a corresponding side portion of the slide plates 20, 20' and another end thereof is hooked on the corresponding protrusions 42, 42' of the guide bosses 40, 40'.

The disk loading operation of the thusly constituted conventional disk guide apparatus of the slot loading type optical disk playback system will now be described with reference to the accompanying drawings.

As shown in FIG. 3, when the optical disk 1 is inserted by a user, since the respective protrusions 42,42' of the guide bosses 40, 40' becomes hooked on each stepped portion 11 of the stopper plate 10 at an initial stage, the optical disk 1 becomes centrally positioned by the guide pins 41, 41' of the guide bosses 40, 40', so that the optical disk 1 is inserted into the optical disk playback system while maintaining its balance.

At this time, when the optical disk 1 is sidedly inserted into the center of the slot, the guide boss 40 which is primarily touched by the optical disk 1 being inserted is backwardly rotated on the hinge pin 3, whereby the guide boss 40 is released from the stepped portion 11 of the stopper plate 10. To the contrary, the protrusion 42 of the other guide boss 40 is hooked on the stepped portion 11 of the stopper plate 10, whereby the slide plates 20, 20' are prevented from moving from left to right, thereby preventing an erroneous insertion of the disk.

When the optical disk 1 is inserted into the optical disk playback system while maintaining balance at its center by the guide pins 41, 41', the guide pins 41, 41' are backwardly pushed by the optical disk 1 being inserted. Accordingly, the guide bosses 40, 40' suppresses the restoring force of the spring 50 supported by the protrusions 42, 42' formed at respective side portions of the guide bosses 40, 40 and backwardly rotates while having the hinge pins 3, 3' hingedly connected to the slide plates 20, 20' as rotational shafts, and at the same time the protrusions 42, 42' become released from the stepped portion 11 of the stopper plate 10.

In case the optical disk 1 is further inserted into the optical disk playback system, the pair of slide plates 20, 20' respectively connected to the guide bosses 40, 40' by the hinge pins 3, 3' becomes distanced by moving from each other, and the rack gears 21, 21' extended from the pair of the slide plates 20, 20' drive the pinion gear 30 by being engaged therebetween, whereby the slide plates 20, 20' becomes moving from left to right for thereby loading the optical disk 1.

However, the conventional disk guide apparatus for the slot loading type optical disk playback system requires too many parts for thereby complicating its structure, so that the complicated assembly process results in an increased production cost and the workability is significantly deteriorated.

Further, the conventional disk guide apparatus for the slot loading type optical disk playback system provides circular guide pins, and accordingly when the optical disk is inserted into the optical disk playback system, the input angle becomes large for requiring increased power, so that it is difficult to replace the disk guide apparatus with compound resin product for thereby resulting in inevitable increase of production cost.

SUMMARY OF THE INVENTION

The present invention is directed to overcoming the conventional disadvantages.

Accordingly, it is an object of the present invention to provide a disk guide apparatus for an optical disk playback system capable of preventing an erroneous insertion of the optical disk and carrying out an accurate loading/unloading operation by use of minimal number of parts by simplifying the structure thereof.

It is another object of the present invention to provide a disk guide apparatus for an optical disk playback system capable of carrying out a loading/unloading operation of an optical disk using less power by decreasing a pressure angle when inserting the disk.

To achieve the above-described objects, there is provided a disk guide apparatus for an optical disk playback system according to the present invention which includes a pinion gear having at least one non-toothed portion, a pair of guide plates respectively having a gear portion being engaged to the pinion gear, and a spring providing an elastic restoration to the guide plates.

The objects and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
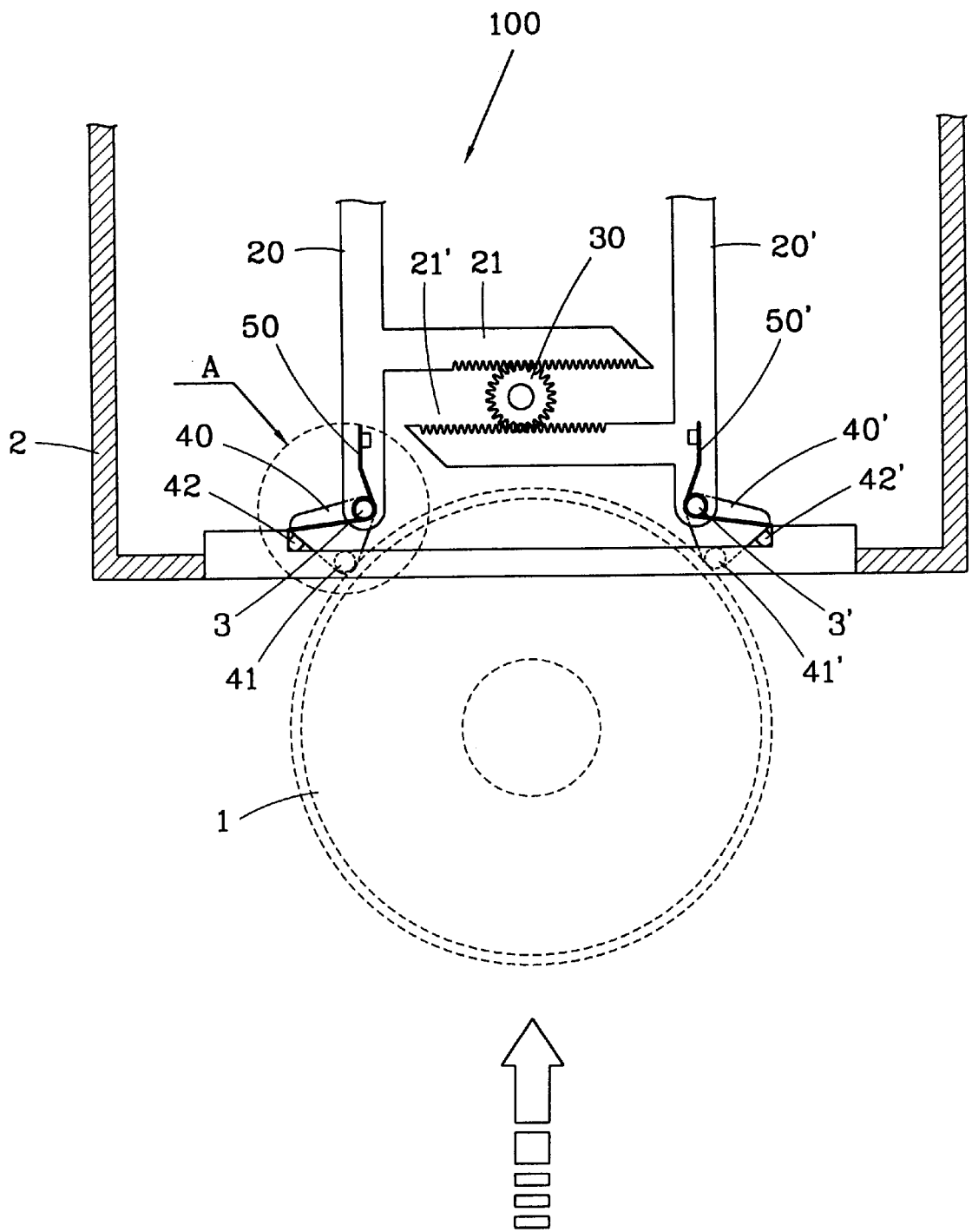
FIG. 1 is a schematic plan view of a conventional disk guide apparatus for an optical disk playback system.
Figure 2:
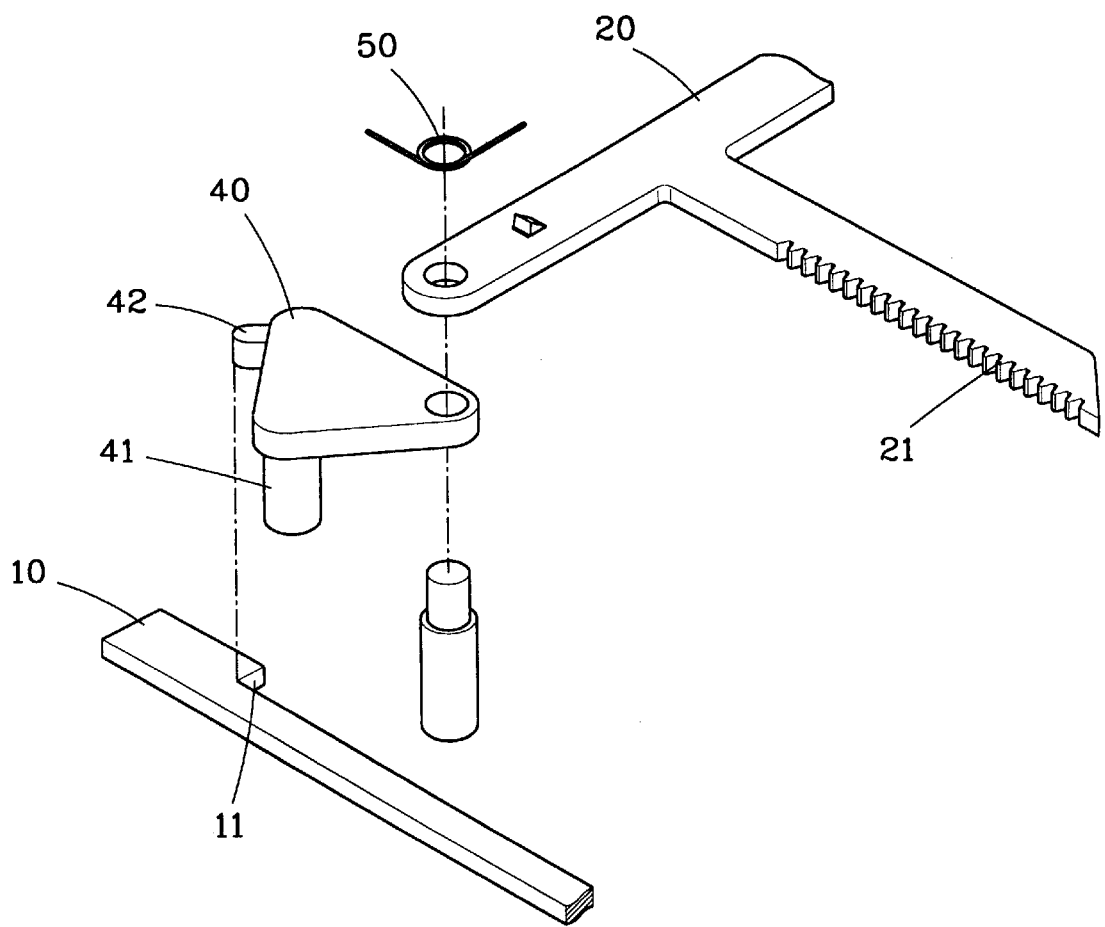
FIG. 2 is an exploded perspective view detailing portion A in FIG. 1.
Figure 3:
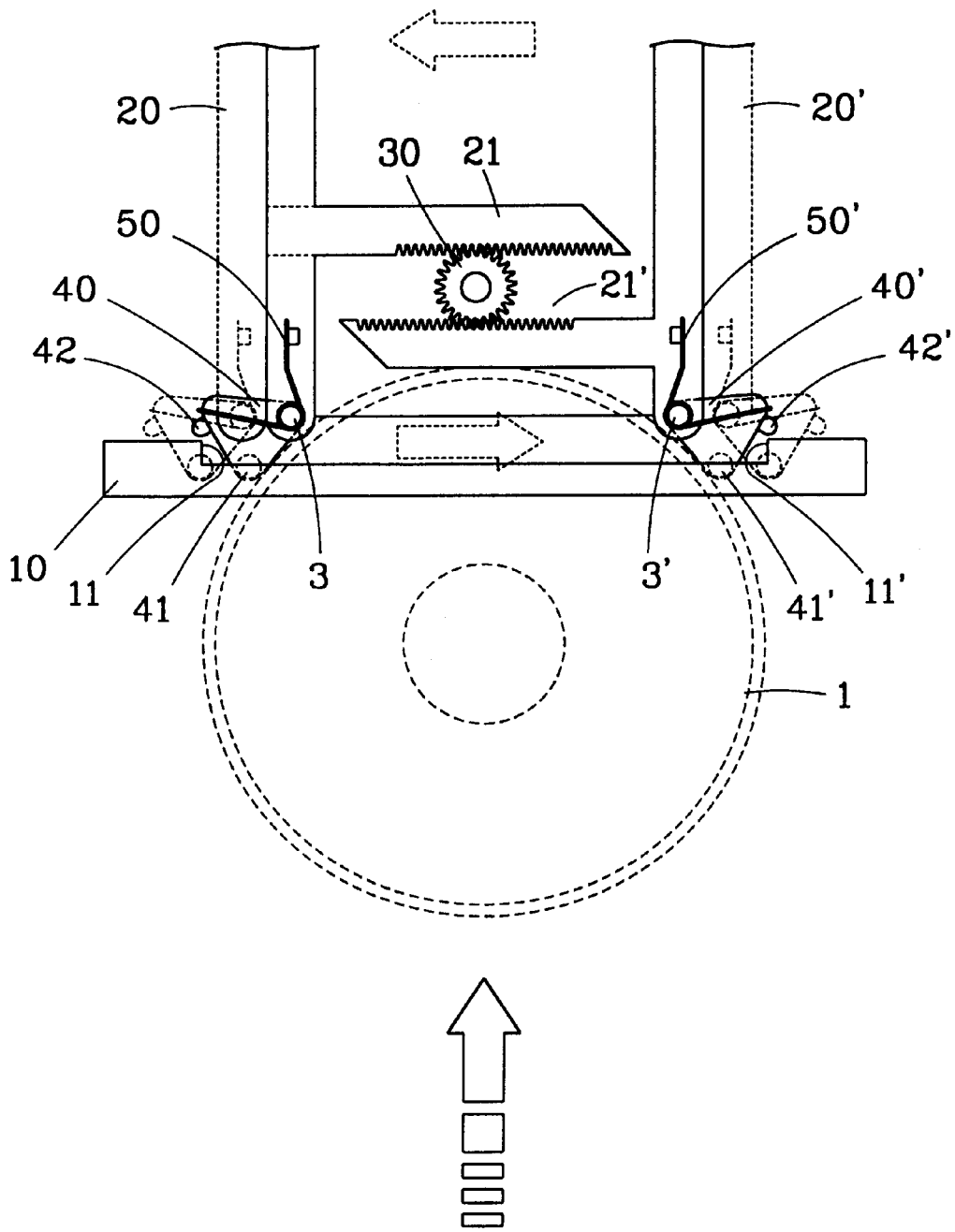
FIG. 3 is a schematic plan view illustrating an optical disk being inserted into a disk guide apparatus for an optical disk playback system according to the present invention.

With reference to the accompanying drawings, the disk guide apparatus for an optical disk playback to prevent misinsertions according to the preferred embodiments of the present invention will now be described, wherein identical reference numerals will be employed as to the identical parts to the conventional art.

Figure 4:
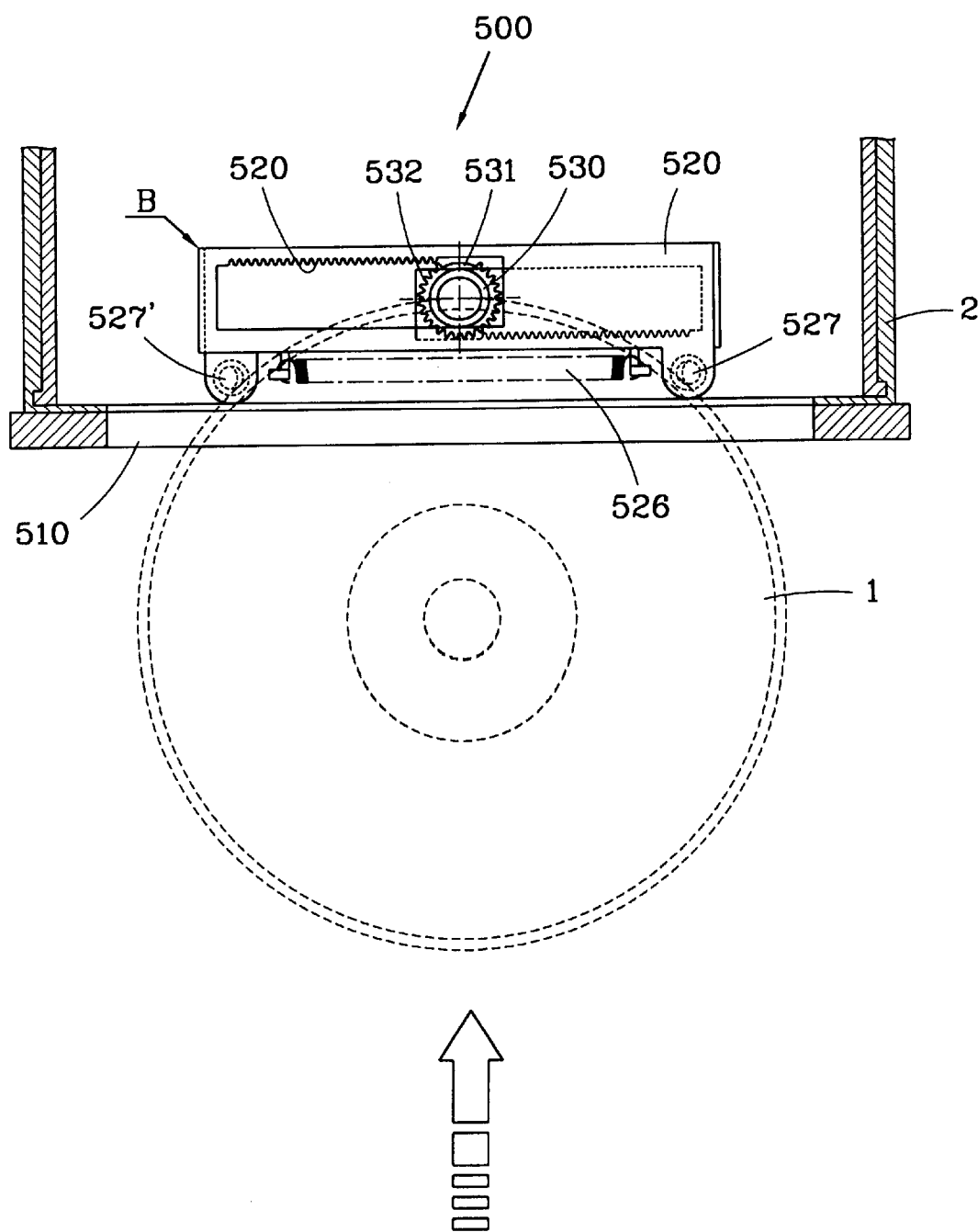
FIG. 4 is a schematic plan view of a disk guide apparatus for an optical disk playback system according to the present invention.
Figure 5:
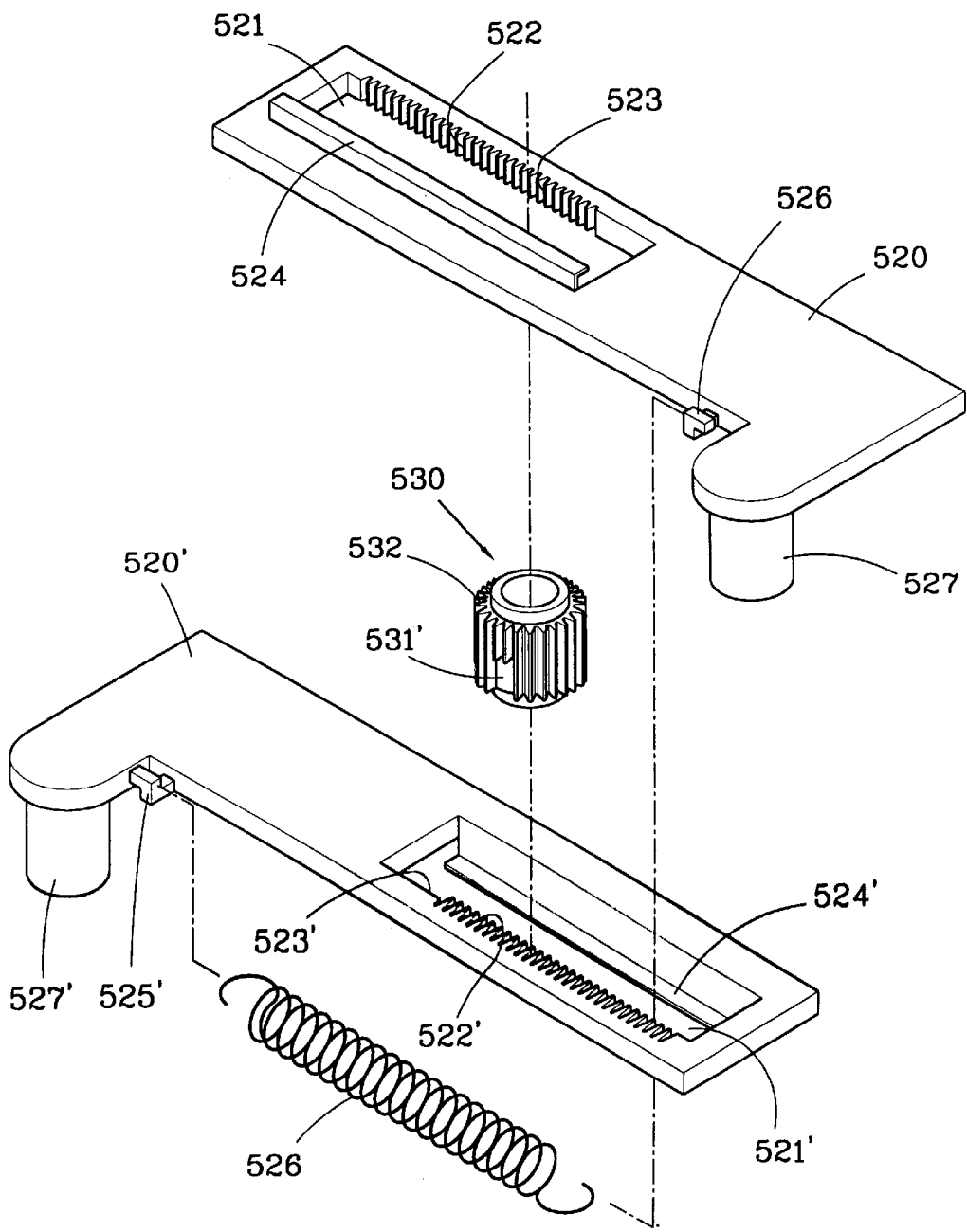
FIG. 5 is an exploded perspective view detailing portion B in FIG. 4.

As shown in FIGS. 4 and 5, the disk guide apparatus 500 for an optical disk playback system according to the present invention includes a rectangular stopper plate 510 having a slot (not shown) to receive the optical disk therethrough. The rectangular stopper plate 510 is provided at a front portion of a housing 2 of the optical disk playback system.

An upperguide plate 520 and a lower guide plate 520' for preventing an erroneous insertion of the optical disk 1 and carrying out its loading/unloading operation are stacked movable to the horizontal direction. The respective guide plates 520, 520' have rectangular insertion openings 521, 521' through the side portions thereof. Rack portions 522, 522' each having a predetermined length are formed on side walls of the rectangular insertion openings 521, 521' to be opposite from each other.

Flat portions 523, 523' are formed adjacent to the rack portions 522, 522'. Stepped guide portions 524, 524' are steppedly extended upwardly and downwardly from the sides of the insertion openings 521, 521'.

A pinion gear 530 is engaged between the rack portions 522, 522' of the insertion openings 521, 521' of the pair of guide plates 520, 520'. The pinion gear 530 becomes guided by the guide portions 524, 524' during its driving.

Figure 6:
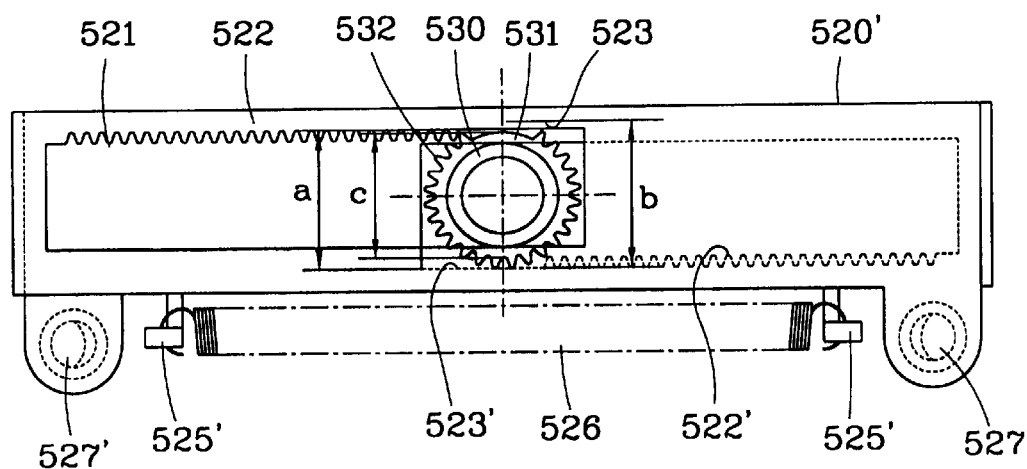
FIG. 6 is a view detailing a pinion gear of the disk guide apparatus for an optical disk playback system according to the present invention.

As shown in FIG. 6, the pinion gear 530 includes a non-tooth portion 531, 531' symmetrically formed therein to correspond to the flat portions 523, 523 of the guide plates 520, 520'.

At this time, distance a between the flat portions 523, 523' of the guide plates 520, 520' is less than a tooth-top-round diameter b and larger than a toothroot-round diameter c of the pinion gear 530.

Support protrusions 525, 525' are correspondingly and symmetrically formed on respective sides of the guide plates 520, 520', and the support protrusions 525, 525' are hooked by a tension spring 526 to provide an elastic restoring force which allows the guide plates 520, 520' to be restored.

Guide pins 527, 527' for preventing an erroneous insertion of the optical disk 1 and carrying out a disk loading/unloading operation are correspondingly and downwardly extended from respective end portions of the guide plates 520, 520'.

Here, the guide pins 527, 527' are eccentrically formed to decrease a pressure angle of the optical disk 1 being inserted so that a disk loading/unloading operation may be carried out with less power. Specifically, the guide pins 527, 527' are respectively formed of a two-arc circular pin having two different radii in the circle.

Also, respective radii of the guide pins 527, 527' which become in contact with the optical disk being inserted are formed larger than the other side radii thereof.

With reference to the accompanying drawings, the loading operation of the disk guide apparatus for an optical disk playback system according to the present invention will now be described in further detail.

First, as shown in FIG. 4, when the optical disk 1 is inserted into the slot (not shown) formed in the stopper plate 510, the optical disk 1 becomes centrally positioned in accordance with the guide pins 527, 527' of the guide plates 520, 520'.

When the disk insertion is further carried out, the guide pins 527, 527' become pushed by the optical disk 1 and accordingly the optical disk 1 is inserted into the optical disk playback system, and subsequently the guide plates 520, 520' from which the guide pins 527, 527' are extended are accordingly pushed to the left side and to the right side. Accordingly, the spring 426 which is hooked on the support protrusions 525, 525' extended from the side portions of the guide plate pair 520, 520' becomes elongated.

At this time, since the flat portions 523, 523' adjacent to the rack portions 522, 522' of the guide plate pair 520, 520' are not interrupted by the toothed portion 532 of the pinion gear 530 during the initial movement, the guide plate pair 520, 520' make smooth initial movements.

However, when the optical disk 1 is sidedly inserted into the slot, the sided direction guide plate 520 makes a predetermined amount of movement resulting from the disk insertion, so that the rack portion 522 of the sided direction guide plate 520 becomes engaged to the toothed portion 532 of the pinion gear 530.

Accordingly, when the pinion gear 530 is about to be rotated, a side of the toothed portion 532 of the pinion gear 530 becomes hooked onto the flat portion 523 of the guide plate 520, thereby preventing the rotation of the pinion gear 530 and at the same time preventing an erroneous insertion of the optical disk 1.

In the meantime, when the optical disk 1 is inserted into the optical disk playback system, force F corresponding to the radius of the optical disk 1 being inserted is applied to the guide pins 527, 527'.

Assuming that a pressure angle during the disk insertion according to the present invention is $\theta_1$ and a pressure angle during the disk insertion according to the conventional art is $\theta_2$, and that the respective forces for pushing the optical disk are $P_1, P_2$, the compared results of the forces for pushing the optical disk by the guide pin 527 according to the present invention and the guide pin 41 according to the conventional art will now be described.

Figure 7:
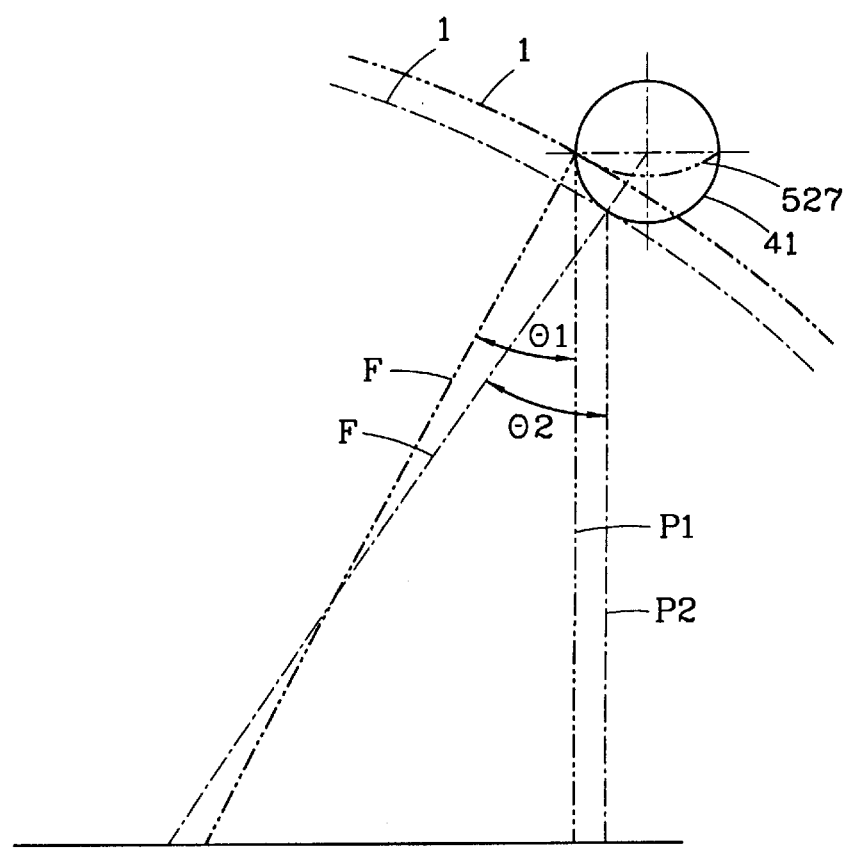
FIG. 7 is a view illustrating pressure angle differences of an optical disk when being inserted by guide pins of the disk guide apparatus according to the present invention and those according to the conventional art.
Figure 8A:
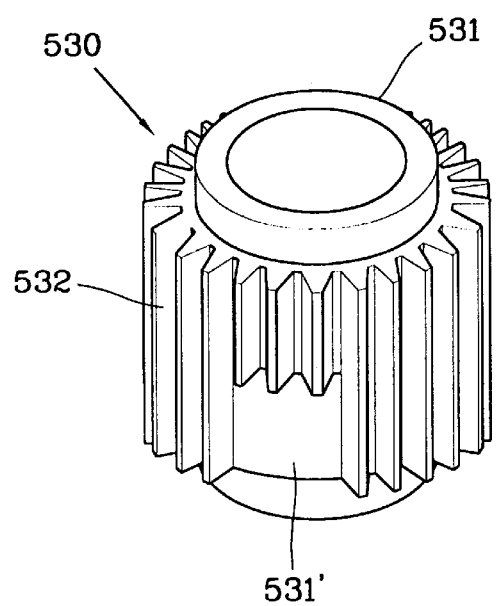
FIG. 8A is a frontal perspective view illustrating a pinion gear.
Figure 8B:
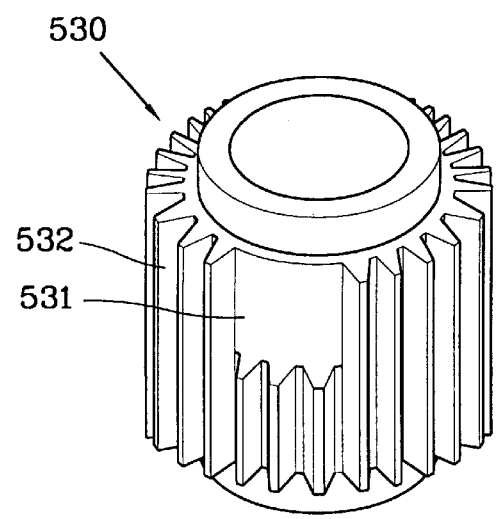
FIG. 8B is a rear perspective view illustrating a pinion gear.

That is, as shown in FIG. 7, the guide pins are operated only by the force applied to the leftward direction, and accordingly when the optical disk is being inserted, the force $P_1$ applied to the guide pin 427 of the present invention is equal to $F\cos\theta_1$ ($P_1 = F\cos\theta_1$), and the force $P_2$ applied to the guide pin 41 of the conventional art is equal to $F\cos\theta_2$ ($P_1 = F\cos\theta_1$), thereby satisfying $P_1 < P_2$.

Therefore, when the force F is identical during the disk insertion, the less the pressure angle $\theta$ the further minimized becomes the loss of the force for widening the guide pins.

As a result, if the arc angle of the guide pins is decreased, the pressure angle $\theta$ becomes decreased, thereby maximizing the widening force of the guide pins from each other.

Subsequently, when the optical disk 1 is further inserted into the optical disk playback system, the guide plate pair 520, 520' moves as much as the flat portion 523 of the insertion opening 521.

Then, according to the insertion force of the optical disk 1, the rack portions 522, 522' of the guide plate pair 520, 520' become engaged to the toothed portion 532 of the pinion gear 530 for thereby driving the pinion gear 530, whereby the guide plate pair 520, 520' becomes moving left to right until the optical disk is completely inserted into the system.

At this time, the pinion gear 530 makes its movement by being guided by the guide portions 524, 524' respectively protruded from a side wall of the insertion openings 521, 521' of the guide plates 520, 520'.

Then, when the optical disk 1 is completely inserted into the optical disk playback system, the guide plate pair 520, 520' becomes restored to their original locations by the spring 526 hooked onto the support protrusions 525, 525', and after the complete restoration of the guide plate pair 520, 520', the flat portions 523, 523' of the guide plates 520, 520' and the non-toothed portions 531, 531' become positioned parallel to each other for thereby completing the loading operation of the optical disk 1.

As described above, the disk guide apparatus for an optical disk playback system according to the present invention is capable of preventing an erroneous insertion of the optical disk and carrying out a disk loading/unloading operation by use of minimal parts thereof, thereby realizing a simplified structure and an easy assembly, as well as decreasing production cost and improving workability.

Also, the disk guide apparatus for an optical disk playback system according to the present invention provides oval shaped guide pins to decrease the pressure angle of the optical disk being inserted, thereby carrying out the disk loading/unloading operation with less power.

Further, the less power requirement in the disk guide apparatus enables compound resin products to be applicable thereto in production thereof, thereby significantly decreasing production cost.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. disk guide apparatus for an optical disk playback system to prevent misinsertions, comprising:

a pair of guide plates respectively having a gear portion;

a pinion gear engaged to the gear portions of the guide plates and having non-toothed portions formed on a circumferential surface thereof for preventing misinsertions of an optical disk; and a spring for providing elastic restoration to the guide plates.

2. The apparatus of claim 1, wherein the non-toothed portions of the pinion gear are two-staged to be engaged to the guide plates.

3. The apparatus of claim 1, wherein the guide plates respectively include a guide pin whose cross-section is not circular to facilitate the guiding of a disk loading/unloading operation.

4. The apparatus of claim 3, wherein the cross-section of the guide pin is oval-shaped and formed of two different radii.

5. The apparatus of claim 4, wherein the radius of the cross-section of the guide pin which comes in contact with an optical disk being inserted is larger than the other of the radii.

6. The apparatus of claim 1, wherein each gear portion is a rack gear formed on a side wall of an insertion opening of the respective guide plates.

7. The apparatus of claim 6, wherein a flat portion is formed adjacent to each rack gear on the side walls of the guide plates so as to prevent misinsertions of the optical disk by interrupting the driving of the pinion gear by toothed portions adjacent to the non-toothed portions of the pinion gear being hooked onto the flat portions of the guide plates when the optical disk is misinserted.

8. The apparatus of claim 7, wherein a distance between the flat portions of the guide plates is less than a tooth-top-round diameter of the pinion gear and larger than a tooth-root-round diameter of the pinion gear.

9. The apparatus of claim 6, wherein each guide plate includes a stepped guide portion upwardly extended from a side of the insertion opening and on the opposite side of the rack gear.

10. The apparatus of claim 1, wherein the non-toothed portions of the pinion gear correspond to flat portions of the guide plates and are oppositely and symmetrically formed on an upper portion and a lower portion respectively of the pinion gear.

11. The apparatus of claim 1, wherein the guide plates and the pinion gear are formed of plastic molding material.

\* \* \* \* \*